(12) United States Patent
Isobe (10) Patent No.: US 7,958,248 B2
(45) Date of Patent: Jun. 7, 2011

(54) INFORMATION PROVIDING SYSTEM, INFORMATION PROCESSING APPARATUS AND METHOD, AND INFORMATION PROVIDING APPARATUS AND METHOD

(75) Inventor: Takatoshi Isobe, Kanagawa (JP)

(73) Assignee: Sony Corporation (JP)

( * ) Notice: Subject to any disclaimer, the term of this patent is extended or adjusted under 35 U.S.C. 154(b) by 1302 days.

(21) Appl. No.: 10/487,843

(22) PCT Filed: Aug. 26, 2002

(86) PCT No.: PCT/JP02/08548
§ 371 (c)(1), (2), (4) Date: Aug. 25, 2004

(87) PCT Pub. No.: WO03/019388
PCT Pub. Date: Mar. 6, 2003

(65) Prior Publication Data
US 2004/0266333 A1  Dec. 30, 2004

(30) Foreign Application Priority Data

Aug. 27, 2001 (JP) ................................. 2001-255584

(51) Int. Cl.
*G06F 15/16* (2006.01)
*G06F 15/173* (2006.01)
*G06F 3/00* (2006.01)
*G06F 13/00* (2006.01)
*H04N 5/445* (2006.01)
*H04N 7/173* (2006.01)
*H04N 7/16* (2006.01)

(52) U.S. Cl. ........ 709/229; 709/217; 709/219; 709/225; 709/227; 725/51; 725/61; 725/109; 725/112; 725/114; 725/136

(58) Field of Classification Search ................ 709/217, 709/219, 225, 227, 203, 231, 232, 236, 229; 725/51, 61, 109, 112, 113, 136; 705/14
See application file for complete search history.

(56) References Cited

U.S. PATENT DOCUMENTS
5,689,799 A * 11/1997 Dougherty et al. .......... 455/2.01
(Continued)

FOREIGN PATENT DOCUMENTS
EP  0 848 553  6/1998
(Continued)

OTHER PUBLICATIONS

Adrian Perrig, "The BiBa one-time signature and broadcast authentication protocol", Proceedings of the 8th ACM conference on Computer and Communication Security, p. 28-37, 2001.*

(Continued)

*Primary Examiner* — Shawki S Ismail
*Assistant Examiner* — Edward J Kim
(74) *Attorney, Agent, or Firm* — Lerner, David, Littenberg, Krumholz & Mentlik, LLP (57) ABSTRACT

The present invention relates to an information providing system, information processing apparatus and method, and information providing apparatus and method, adapted to suppress broadcast contents from being utilized unduly. A digital broadcast receiver receives network contents from a contents server. The network contents may make reference to broadcast contents sent on the air by one or more broadcast stations. The broadcast contents broadcast by the broadcast stations includes a broadcast wave BIT (Broadcaster Information Table) containing the address information of an authentication information server. The digital broadcast receiver accesses the authentication information server based on the address information, and requests for an authentication of whether a reference to broadcast contents based on the network contents is allowed. According to the authentication result, the digital broadcast receiver controls a reference to broadcast contents based on the network contents. The present invention is applicable to a television receiver connectable to the Internet.

12 Claims, 8 Drawing Sheets

U.S. PATENT DOCUMENTS

| | | | |
|---|---|---|---|
| 5,929,849 A | | 7/1999 | Kikinis |
| 5,931,905 A * | | 8/1999 | Hashimoto et al. ............ 709/217 |
| 6,006,256 A * | | 12/1999 | Zdepski et al. ................ 725/114 |
| 6,098,106 A * | | 8/2000 | Philyaw et al. ................ 709/238 |
| 6,198,509 B1 * | | 3/2001 | Dougherty et al. ............ 348/467 |
| 6,251,016 B1 | | 6/2001 | Tsuda et al. |
| 6,330,719 B1 * | | 12/2001 | Zigmond et al. ............... 725/121 |
| 6,460,180 B1 * | | 10/2002 | Park et al. ......................... 725/40 |
| 6,615,268 B1 * | | 9/2003 | Philyaw et al. ................ 709/229 |
| 7,392,481 B2 * | | 6/2008 | Gewickey et al. ............. 715/716 |
| 2002/0069286 A1 * | | 6/2002 | Yu ................................. 709/229 |

FOREIGN PATENT DOCUMENTS

| | | |
|---|---|---|
| EP | 0 854 650 | 7/1998 |
| JP | 10-173612 A1 | 6/1998 |
| JP | 10-254796 A1 | 9/1998 |
| JP | 11-510978 A1 | 9/1999 |
| JP | 2000-285057 A1 | 10/2000 |

OTHER PUBLICATIONS

Clausen, H. D., et al: "Internet services via direct broadcast satellites" Perfromance, Computing, and Communications Conference, 1997, IPCCC 1997, IEEE International Phoenix, Tempe, AZ, Feb. 5-7, 1997, New York, NY, IEEE, US, Feb. 5, 1997, pp. 468-475.

"Advanced Television Enhancement Forum Specification (ATVEF), Comment Draft Version 1.Orl, (25/./92/99)", Internet Citation, [Online] 1998, www.intercast.org/atvef_spec/TVE-public.htm.

* cited by examiner

```
broadcaster_information_section ( ) {
  table_id
  section_syntax_indicator
  ...
  ...
  for (j=0; j<N2; j++) {
    broadcaster_id
    reserved_future_use
    broadcaster_descriptors_length
    for (k=0; k<N3; k++) {
      descriptor ( )
    }
    broadcaster_certificate_host_length
    for (k2=0; k<N4; k++) {
      descriptor ( )
    }
  }
}
```

FIG. 7

FIG. 8 http://www.hoge.com/contents/ http://www.sony.co.jp/bmlcontents/dtv_info/ http://www.foo.org/contents2/etc/

NETWORK CONTENTS LIST

FIG. 9 http://www.bmlcertificate.org/certificate.cgi?! HOST= http://www.sony.co.jp/bmlcontents/dtv_info/&STREAM= arib://0004.0749.0064/51

CGI ARGUMENT

FIG. 10

OK http://www.sony.co.jp/bmlcontents/dtv_info/

AUTHENTICATION RESULT

INFORMATION PROVIDING SYSTEM, INFORMATION PROCESSING APPARATUS AND METHOD, AND INFORMATION PROVIDING APPARATUS AND METHOD

BACKGROUND OF THE INVENTION

1. Field of the Invention

The present invention relates to an information providing system, information processing apparatus and method, and information providing apparatus and method, and more particularly to an information providing system, information processing apparatus and method, and information providing apparatus and method adapted to suppress broadcast contents from being utilized unduly.

2. Background Art

Recently, with the spread of the Internet, data contents are received through the Internet by connecting various information appliances to the Internet.

For example, by connecting to the Internet a digital television receiver with Internet connection functionality, the digital television receiver can receive and display not only data contents but also a digital television signal (stream data) sent on the air through a satellite.

However, if a digital television receiver has Internet connection functionality, by making the network contents received via the Internet refer to a program of a television broadcast (broadcast contents), a television picture as the broadcast contents made reference to by the network content can be displayed simultaneously while displaying the network contents on the screen of the digital television receiver.

As a result, the broadcast contents may be unduly referenced by the network contents, threatening the copyright of broadcast contents.

SUMMARY OF THE INVENTION

The present invention, made in view of the above situation, may help to suppress information from being unduly utilized, thereby helping to correctly utilize information.

An information providing system of the present invention includes a first information providing apparatus operable to provide an information processing apparatus with first information for making reference to a second information; the information processing apparatus operable to receive the first information from the first information providing apparatus, receive the second information, extract address information for accessing a third information providing apparatus from the received second information, access the third information providing apparatus based on the extracted address information and receive a determination result based on the authentication information, and control a reference to the second information based on the first information according to the received determination result; the third information providing apparatus being operable to hold the authentication information, make a determination based on the held authentication information when accessed from the information processing apparatus and provide the determination result to the information processing apparatus.

The first information providing apparatus can provide network content as the first information through the Internet, and the second information providing apparatus can provide broadcast content as part of the second information by broadcast.

The second information providing apparatus can include the address information in a BIT (Broadcaster Information Table) of a broadcast signal for broadcasting the broadcast contents.

The third information providing apparatus can provide a list of the second information allowed for a reference by the first information, the list being provided as a part of the determination result.

The third information providing apparatus can provide information representative of whether a reference to the second information by the first information is allowed, the representative information being provided as a part of the determination result.

The information processing apparatus can access the third information providing apparatus through the Internet, based on the extracted address information.

A first information providing method includes: a first information providing apparatus operable to provide an information processing apparatus with first information for making reference to second information; the information processing apparatus operable to receive the first information from the first information providing apparatus, receive the second information, extract address information for accessing a third information providing apparatus from the received second information, access the third information providing apparatus based on the extracted address information and receive a determination result based on the authentication information, and control a reference to the second information based on the first information according to the received determination result; the third information providing apparatus operable to hold the authentication information, make a determination based on the held authentication information when accessed from the information processing apparatus and provide the determination result to the information processing apparatus.

An information processing apparatus comprises: first receiving means for receiving first information from a first information providing apparatus; second receiving means for receiving second information being made reference to by the first information, the second information being received from a second information providing apparatus; extracting means for extracting address information for accessing a third information providing apparatus, the third information providing apparatus holding authentication information for authenticating a reference to the second information, the address information being extracted from the second information received by the second receiving means; third receiving means for accessing the third information providing apparatus based on the address information extracted by the extracting means, and for receiving a determination result based on the authentication information; and control means for controlling a reference to the second information based on the first information, according to the determination result received by the third receiving means.

The first receiving means can receive network contents provided by the first information providing apparatus through the Internet as the first information, the network contents being part of the first information, and the second receiving means can receive broadcast contents broadcast by the second information providing apparatus, the broadcast contents being part of the second information.

The extracting means can extract the address information from a BIT (Broadcaster Information Table) of a broadcast signal of the broadcast contents broadcast by the second information providing apparatus.

The third receiving means can receive a list of the second information which is allowed to be referenced by the first information, the list being received from the third information providing apparatus as part of the determination result.

The third receiving means can receive information representative of whether a reference to the second information by the first information is allowed, the representative information is from the third information providing apparatus as part of the determination result.

The third receiving means can receive the determination result from the third information providing apparatus through the Internet.

The information processing apparatus of the invention can further comprise display control means for displaying the second information received by the second receiving means simultaneously with the first information received by the first receiving means, the first and second information being displayed according to the determination result received by the third receiving means.

The information processing apparatus of the invention can further comprise display control means for simultaneously displaying the network contents received by the first receiving means and the broadcast contents received by the second receiving means, the broadcast contents being made reference to by the network contents, the network contents and the broadcast contents being displayed on a same screen according to the determination result received by the third receiving means.

An information processing method comprises: receiving first information from a first information providing apparatus; receiving second information being made reference to by the first information, the second information being received from a second information providing apparatus; extracting address information for accessing a third information providing apparatus, the third information providing apparatus holding authentication information for authenticating a reference to the second information, the address information being extracted from the second information received from the information providing apparatus; accessing the third information providing apparatus based on the address information extracted by the extracting step, and receiving a determination result based on the authentication information; controlling a reference to the second information based on the first information, according to the received determination result.

A recording medium recorded with a program for making a computer execute a method of processing information comprises: receiving first information from a first information providing apparatus; receiving second information being made reference to by the first information, the second information being received from a second information providing apparatus; extracting address information for accessing a third information providing apparatus, the third information providing apparatus holding authentication information for authenticating a reference to the second information, the address information being extracted from the second information received by the second information providing apparatus; accessing the third information providing apparatus based on the address information extracted by the extracting step, and receiving a determination result based on the authentication information; and controlling a reference to the second information based on the first information, according to the received determination result.

A system for performing a method of processing information, the system comprising: a processor operable to execute instructions; and instructions for performing the method of processing information, the method comprising: receiving first information from a first information providing apparatus; receiving second information being made reference to by the first information, the second information being received from a second information providing apparatus; extracting address information for accessing a third information providing apparatus, the third information providing apparatus holding authentication information for authenticating a reference to the second information, the address information being extracted from the second information received from the second information providing apparatus; accessing the third information providing apparatus based on the address information extracted by the extracting step, and receiving a determination result based on the authentication information; and controlling a reference to the second information based on the first information, according to the received determination result.

An information providing apparatus comprising: holding means for holding authentication information for authenticating a reference to second information based on first information; accepting means for accepting an access request from an information processing apparatus which utilizes the first information and the second information; determining means for making a determination based on the authentication information held by the holding means when an access request from the information processing apparatus is accepted by the accepting means; and transmitting means for transmitting a determination result by the determining means to the information processing apparatus.

The accepting means can accept an access request from the information processing apparatus through the Internet.

The first information can include network contents to be provided through the Internet, while the second information can include broadcast contents to be provided by broadcast.

A broadcast signal for broadcasting the broadcast contents can include address information for accessing the information providing apparatus, the address information being provided in a BIT of the broadcast signal.

The transmitting means can transmit a list of the second information that is allowed to be referenced by the first information, the list being part of the determination result.

The transmitting means can transmit information representative of whether or not a reference to the second information by the first information is allowed, the representative information being part of the determination result.

An information providing method comprising: holding authentication information concerning authenticating a reference to second information based on first information; accepting an access request from an information processing apparatus which utilizes the first information and the second information; making a determination based on the authentication information held by a process of the holding step when an access request from the information processing apparatus is accepted by the accepting step; and transmitting a determination result by the determining step to the information processing apparatus.

A recording medium recorded with a program for making a computer execute a method of providing information, the method comprising: holding authentication information concerning authenticating a reference to second information based on first information; accepting an access request from an information processing apparatus which utilizes the first information and the second information; making a determination based on the authentication information held the holding step when an access request from the information processing apparatus is accepted by the accepting step; and transmitting a determination result by the determining step to the information processing apparatus.

A system for performing a method of providing information, the system comprising: a processor operable to execute instructions; and instructions for performing the method of providing information, the method including: holding authentication information concerning authenticating a reference to second information based on first information; accepting an access request from an information processing apparatus which utilizes the first information and the second information; making a determination based on the authentication information held by the holding step when an access request from the information processing apparatus is accepted by the accepting step; and transmitting a determination result by the determining step to the information processing apparatus.

In the information providing system and information providing method of the present invention, the first information providing apparatus provides first information making reference to second information to the information processing apparatus. The information processing apparatus receives second information being made reference to by the received first information from the second information providing apparatus, extracts address information for accessing the third information providing apparatus from the second information, accesses the third information providing apparatus on the basis of the address information and receives a determination result based on authentication information. The third information providing apparatus holds authentication information, which, when accessed from the information processing apparatus, makes a determination based on the authentication information and provides a determination result to the information processing apparatus.

In the information processing apparatus, method and program of the present invention, second information being made reference to by first information received from the first information providing apparatus is received from a second information providing apparatus, to extract address information for accessing a third information providing apparatus from the second information. Based on the extracted address information, the third information providing apparatus is accessed to receive a determination result. According to the determination result, the reference to the second information based on the first information is controlled.

In the information providing apparatus, method and program of the present invention, authentication information concerning authenticating a reference to the second information by the first information is held. When an access from the information processing apparatus is accepted, a determination based on authentication information is made to send a determination result to the information processing apparatus.

DETAILED DESCRIPTION

Figure 1:
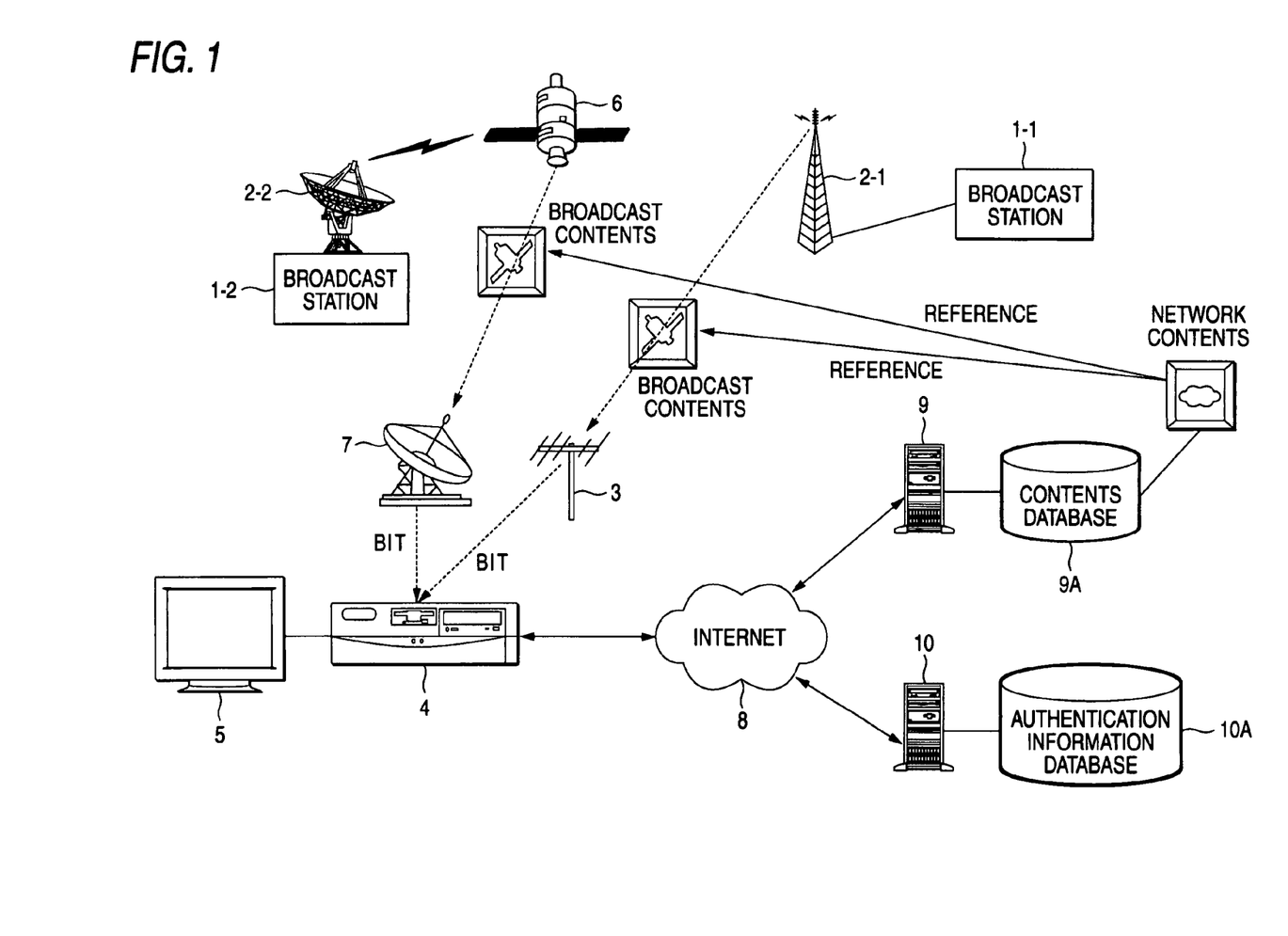
FIG. 1 is a figure showing a configuration of an information providing system, in accordance with an embodiment of the present application.

FIG. 1 represents an embodiment of a configuration of an information providing system to which the present invention is applied. A broadcast station 1-1, at its radio tower 2-1, sends broadcast contents over the air to households. Each household receives the broadcast contents by a digital broadcast receiver 4 through an antenna 3.

Likewise, a broadcast station 1-2, at its parabolic antenna 2-2, sends broadcast contents over the air to households through a satellite 6. In each household, the digital broadcast receiver 4 receives the broadcast contents through a parabolic antenna 7.

Figure 2A:
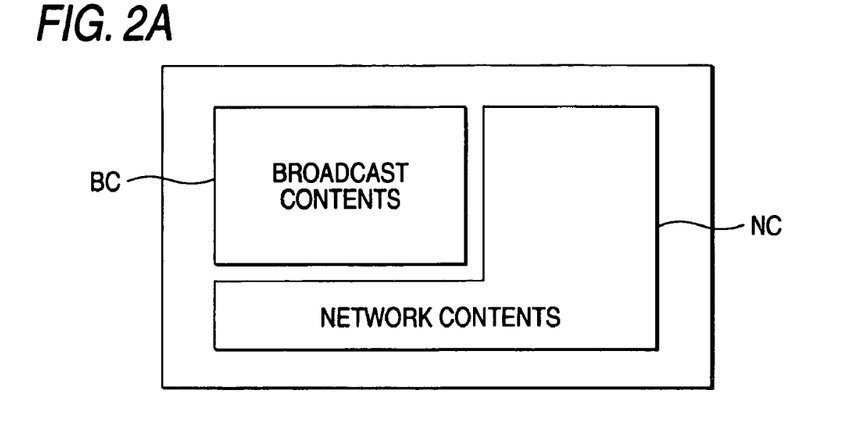
FIG. 2A is a figure showing a display example in which network contents and broadcast contents are displayed simultaneously on the same screen.
Figure 2B:
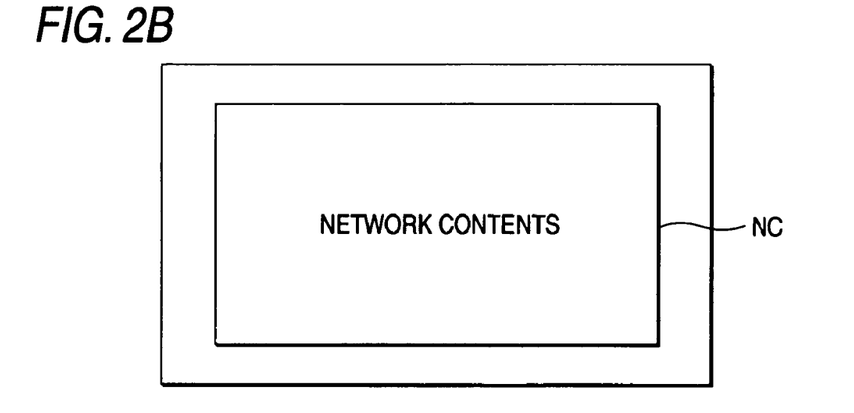
FIG. 2B is a figure showing a display example in which network contents are displayed.
Figure 2C:
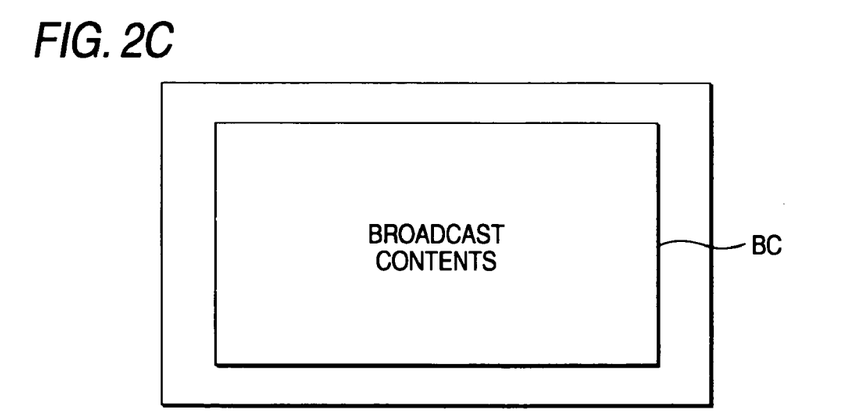
FIG. 2C is a figure showing a display example in which broadcast contents are displayed.

The digital broadcast receiver 4 outputs the broadcast contents received through the antenna 3 or parabolic antenna 7 to a monitor 5, to a display. As a result, as shown in FIG. 2C, for example, broadcast contents BC picture is displayed on the monitor 5.

A contents server 9 includes a contents database 9A. The contents server 9 distributes network contents stored in the contents database 9A to households through the Internet 8. In each household, the network contents are received by the digital broadcast receiver 4 and outputted to and displayed on the monitor 5. FIG. 2B represents a display example in which a display is provided on the monitor 5 in such a case. In this display example, network contents NC are provided on the monitor 5.

The network contents held by the contents server 9 makes reference to broadcast contents sent over the air by the broadcast station 1-1 or the broadcast station 1-2, as required. In the case in which the network contents are making reference to broadcast contents, the network contents NC and the broadcast contents BC are simultaneously displayed on the same screen of the monitor 5, as shown in FIG. 2A, for example.

An authentication information server 10 includes an authentication information database 10A. The authentication information database 10A stores authentication information including information representative of whether network contents are allowed to make reference to broadcast contents. The authentication information server 10 is connected to the Internet 8 so that it can carry out an authentication process at the request of the digital broadcast receiver 4 and send an authentication result to the digital broadcast receiver 4. The address information, which is required for the digital broadcast receiver 4 to access the authentication information server 10 through the Internet 8, is added on a BIT (Broadcaster Information Table) of a broadcast wave sent on the air broadcast contents broadcast by the broadcast stations 1-1, 1-2.

Figure 3:
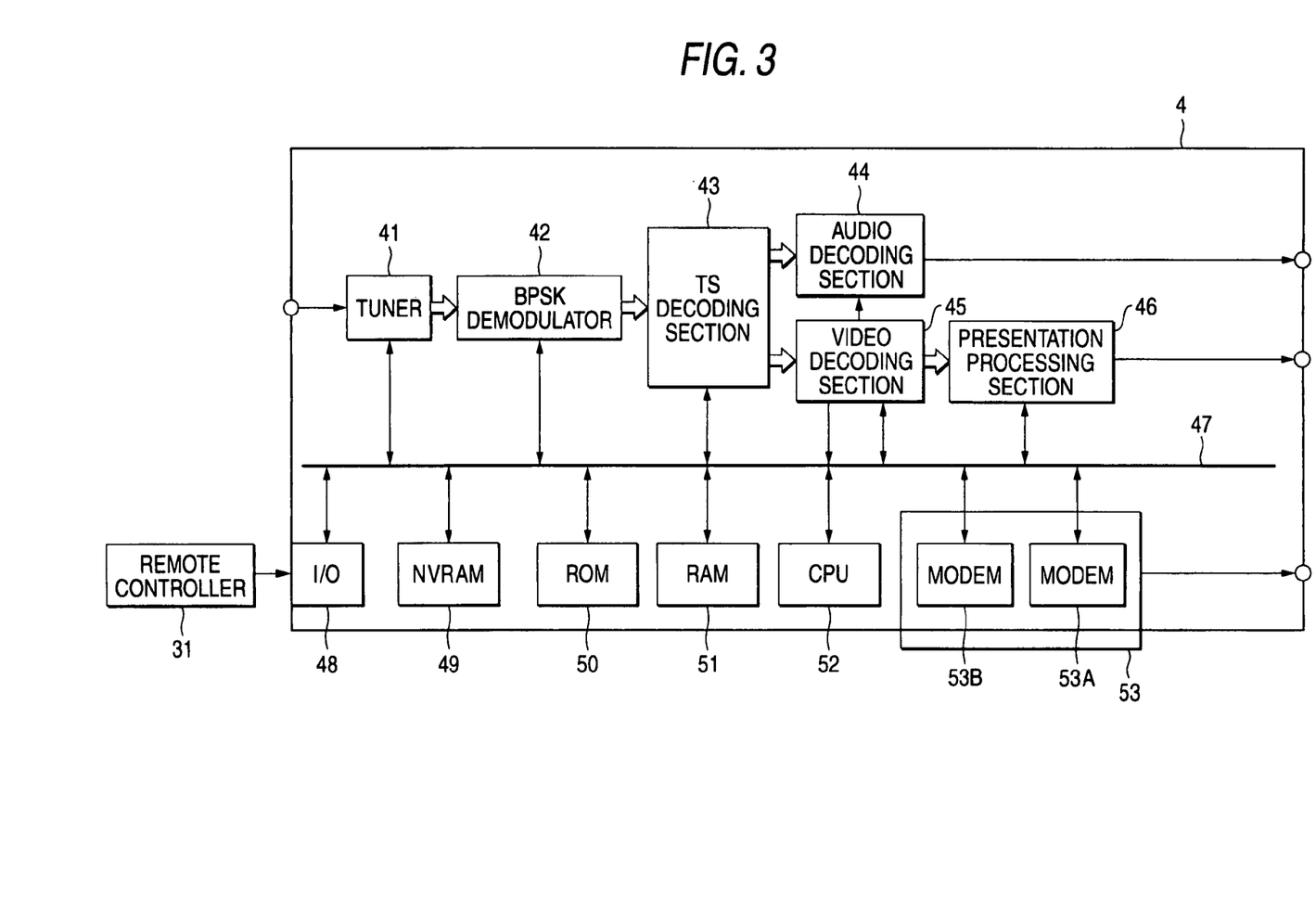
FIG. 3 is a block diagram showing a configuration of the digital broadcast receiver of FIG. 1.

FIG. 3 represents a hardware configuration of the digital broadcast receiver 4. A tuner 41 receives a broadcast signal from the radio tower 2-1 or satellite 6 through the antenna 3 or parabolic antenna 7, and outputs a reception signal to a BPSK (Binary Phase Shift Keying) demodulator 42. The BPSK demodulator 42 demodulates the reception signal BPSK from the tuner 41 and outputs a demodulated signal to a transport stream (TS) decoding section 43.

The TS decoding section 43 extracts the video data and audio data of a predetermined channel, instructed by a CPU 52, from the transport-stream demodulated signal inputted from the BPSK demodulator 42 through a system bus 47, and outputs the video data to a video decoding section 45 and the audio data to an audio decoding section 44.

The video decoding section 45 decodes the inputted video data based on an MPEG 2 scheme and outputs it to a presentation processing section 46. The presentation processing section 46 combines, as required, the video data inputted from the video decoding section 45 with the data of data contents supplied from the CPU 52 through the system bus 47, thus providing an output and display onto the monitor 5.

The audio decoding section 44 decodes the audio data inputted from the TS decoding section 43 and outputs it to a speaker (not shown).

An input/output (I/O) interface 48, when inputted by an operating signal from a remote controller 31, supplies it to the CPU 52 through the system bus 47.

The CPU 52 carries out various processes according to the program stored in a ROM 50. A RAM 51 can be used to store a program or data required for the CPU 52 to execute various processes. An NVRAM (Non-Volatile RAM) 49 can be used to store data to be necessarily stored after a digital television receiver 7 is powered off. A network interface 53 executes an interface process to access the Internet 8.

The network interface 53, having a modem 53A and a modem 53B, is always connected to the network 8 by the modem 53A. The modem 53B is used when connected to a network other than the Internet 8.

Figure 4:
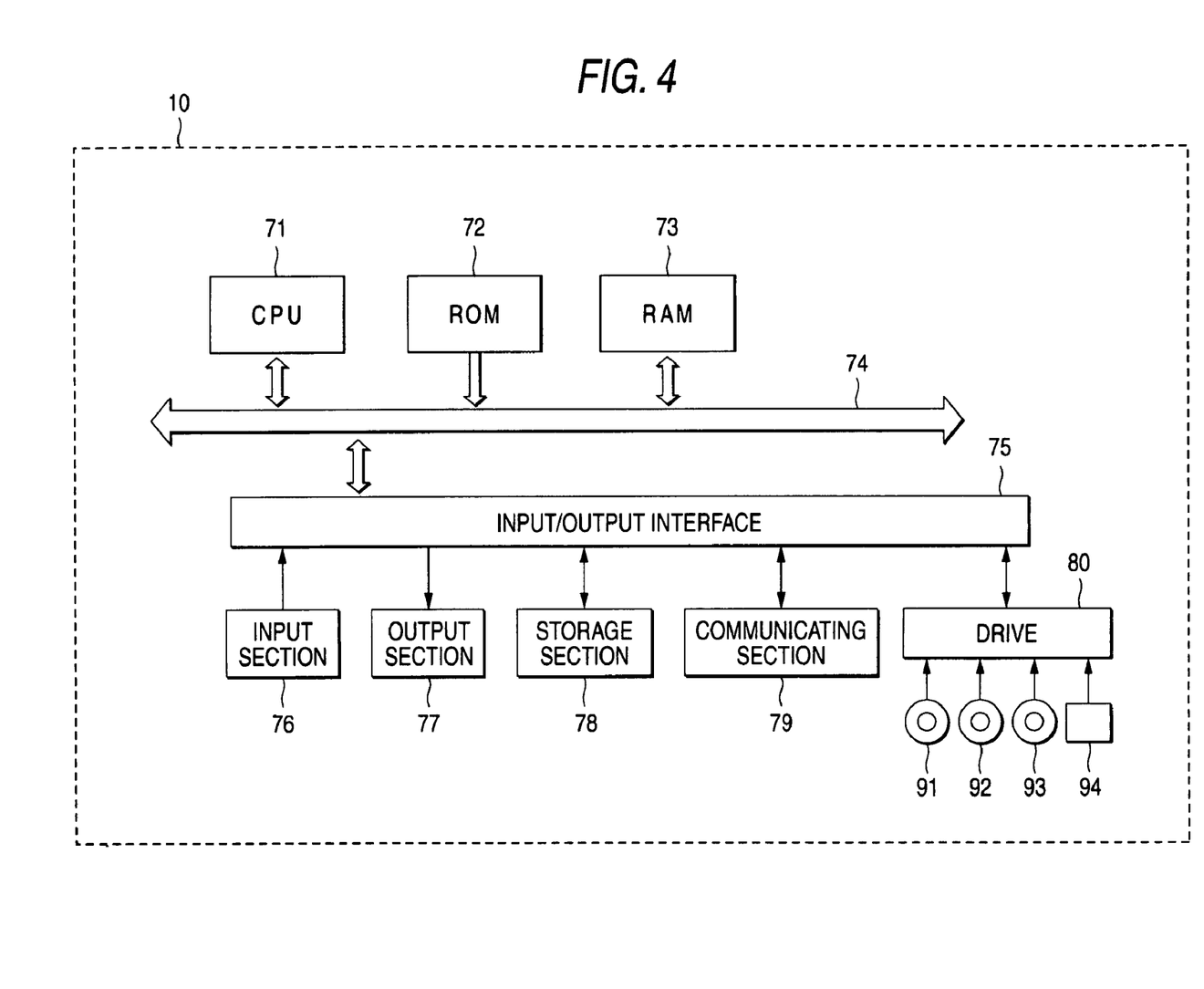
FIG. 4 is a block diagram showing a configuration of the authentication information server of FIG. 1.

FIG. 4 represents an embodiment of a configuration example of the authentication information server 10. In FIG. 4, a CPU (Central Processing Unit) 71 carries out various processes according to the program stored in a ROM (Read Only Memory) 72 or the program loaded from a storage section 78 to a RAM (Random Access Memory) 73. A RAM 73 can be used to store the data required for the CPU 71 to execute various processes.

The CPU 71, the ROM 72 and the RAM 73 are connected to each other via the bus 74. The bus 74 is connected also to an input/output interface 75.

The input/output interface 75 is connected to an input section 76 which can be configured with a keyboard, a mouse or the like, a display such as a CRT (Cathode Ray Tube), an LCD (Liquid Crystal display) or the like, an output section 77 such as a speaker or the like, a storage section 78 such as a hard disk, and a communicating section 79 configured with a modem, a terminal adapter or the like. The communicating section 79 carries out a communication process through a network such as the Internet 8.

The input/output interface 75 is also connected to a drive 80 as required, to be suitably loaded with a magnetic disk 91, an optical disk 92, a magneto-optical disk 93, a semiconductor memory 94 or the like. The computer program can be read out of such devices and can be loaded onto the storage section 78, as required.

Figure 5:
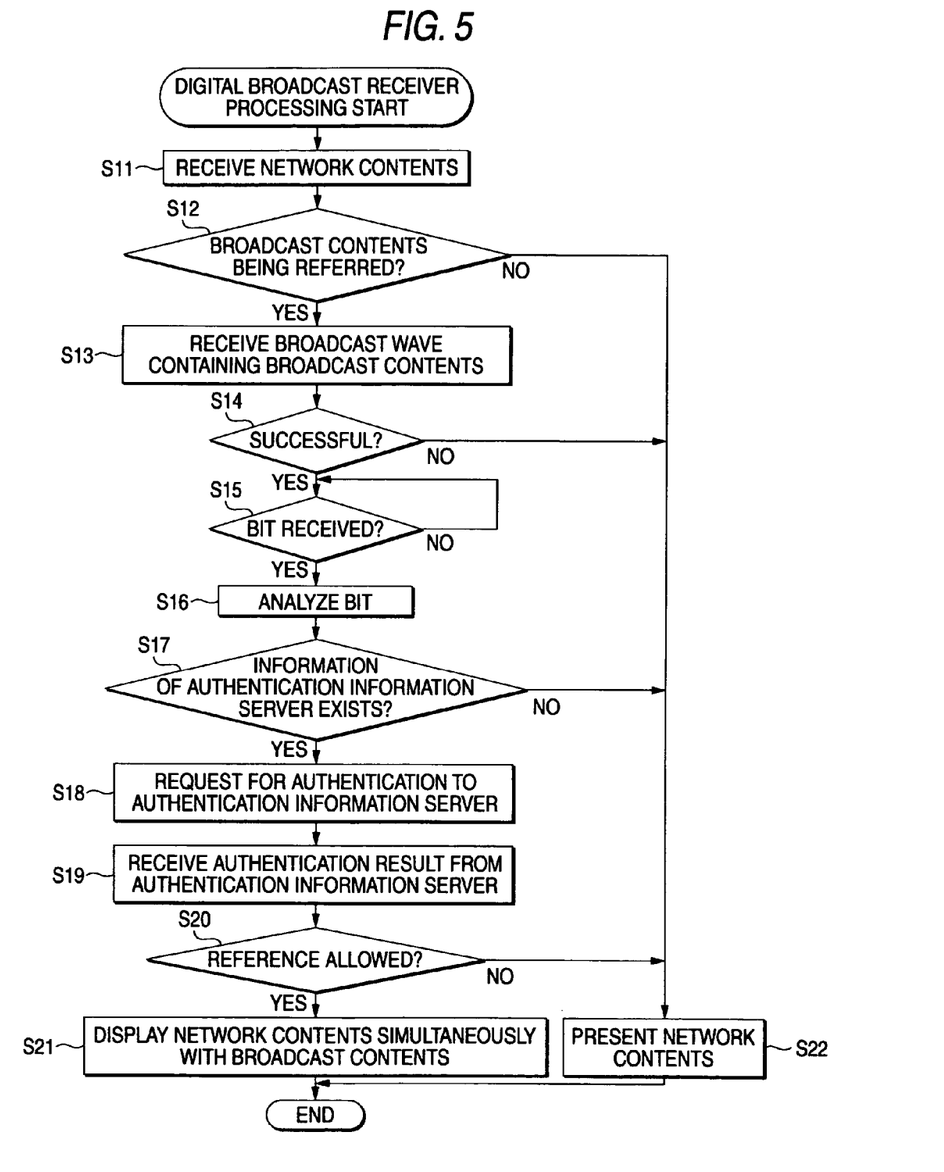
FIG. 5 is a flowchart of the operation of the digital broadcast receiver of FIG. 1, in accordance with an embodiment of the present application.

Now, explanation is provided of an embodiment of operation of the digital broadcast receiver 4, with reference to the flowchart of FIG. 5. At step S11, the CPU 52 of the digital broadcast receiver 4 executes a process to receive network contents instructed by user's operation of the remote controller 31. Namely, the CPU 52 controls the modem 53A to access the contents server 9 through the Internet 8. Then, the CPU 52 requests the contents server 9 to send contents instructed by the user.

The contents server 9, as a result of the request, reads the designated network contents from the contents database 9A and sends it to the digital broadcast receiver 4 through the Internet 8. The CPU 52 of the digital broadcast receiver 4, when it receives the network contents through the modem 53A, supplies and stores it onto the RAM 51.

At step S12, the CPU 52 determines whether the network contents received at the process of step S11 is making reference to broadcast contents. In the case that the network contents is not making reference to broadcast contents, the process proceeds to step S22 where the CPU executes a process to present the network contents received at the process of step S11. Namely, at this time, the CPU 52 reads out the network contents stored in the RAM 51 and forwards it to the presentation processing section 46 where it is converted into a video signal, thereafter being outputted to and displayed on the monitor 5. In this manner, the network contents NC are displayed on the monitor 5 as shown in FIG. 2B.

At step S12, if it is determined that the network contents are making reference to broadcast contents, the process proceeds to step S13 where the CPU 52 executes a process to receive a broadcast wave including the broadcast contents to which reference is being made. Namely, at this time, the CPU 52 controls the tuner 41, and causes the tuner 41 to receive a broadcast signal of a channel that the broadcast contents are on the air which is made reference to by the network contents received at the process of step S11. At step S14, the CPU 52 determines whether the reception process of step S13 has been successful. In the case where the reception process is not successful (in the case a broadcast wave containing a designated broadcast contents could not have been received), the process proceeds to step S22, to execute a process of presenting the network contents. Namely, in this case, because a broadcast wave could not have been received, only the network contents NC are displayed as shown in FIG. 2B.

At step S14, in the case of a determination that a broadcast wave containing the broadcast contents has been successfully received, the process proceeds to step S15. The CPU 52 waits until a BIT (Broadcast Information Table) is received. This BIT is added on a broadcast wave and, which is to be broadcast from the broadcast stations 1-1, 1-2, includes information about a broadcaster.

Figure 6:
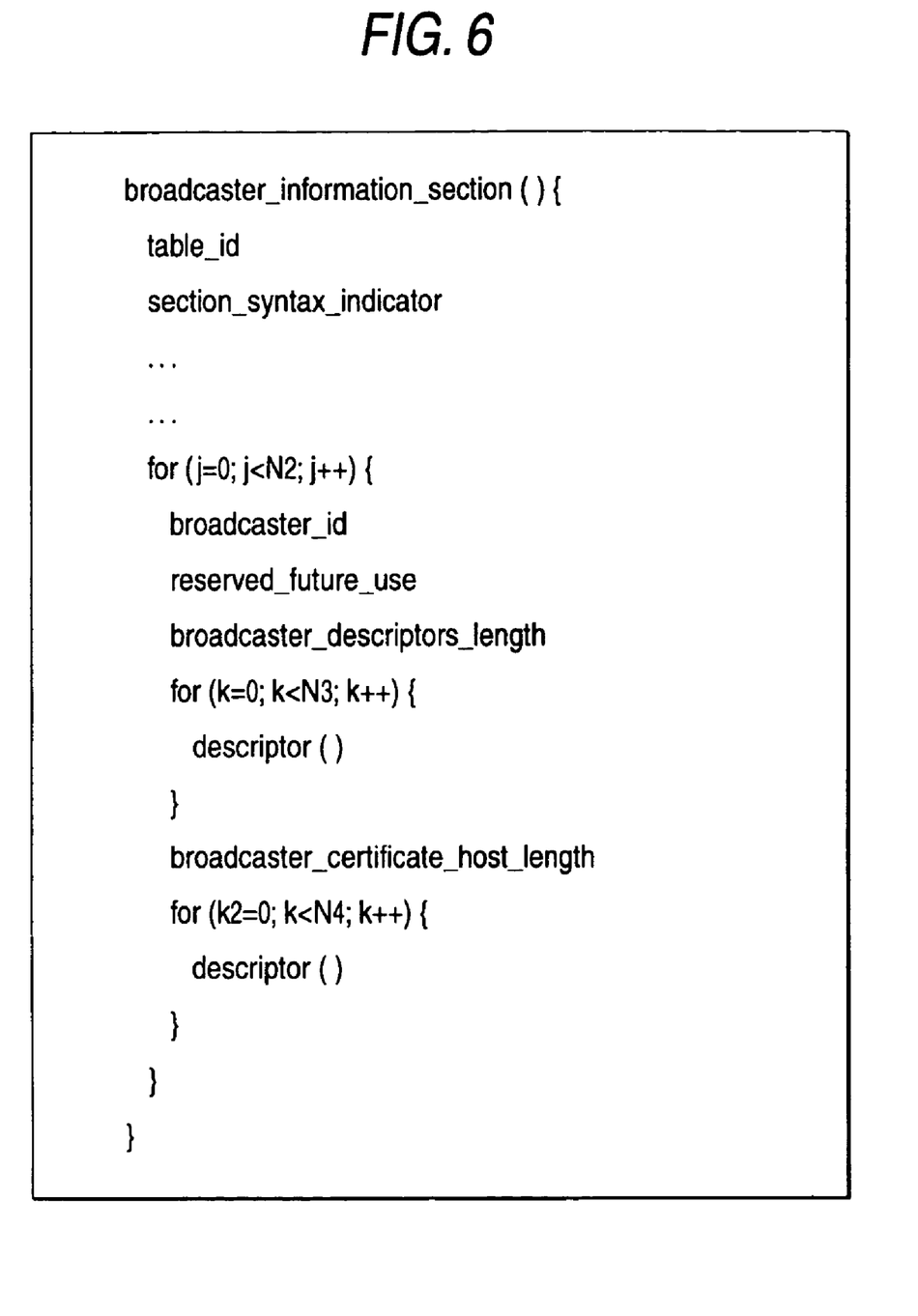
FIG. 6 is a diagram of the configuration of a BIT, in accordance with an embodiment of the present application.

FIG. 6 represents a configuration example of the BIT. The field "table_id" represents an ID of this BIT. The field "broadcaster_certificate_host_length" represents a length of a character string configuring the URI (Uniform Resource Indicator) of the authentication information server holding the authentication information about broadcast contents containing the BIT. The immediately following descriptor is stored therein with a URI character string of the authentication information server (authentication information server 10, in this example). Accordingly, by reading out the descriptor, address information can be obtained which is required for accessing the authentication information server 10 through the Internet 8.

Accordingly, in the case of a determination at step S15 that a BIT is received, the CPU 52 at step S16 analyzes the BIT. At step S17, the CPU 52 determines whether the information of the authentication information server is contained in the BIT, on the basis of a result of analysis. In the case in which the descriptor containing the address information of the authentication information server is not contained in the BIT, since the broadcast contents are not allowed reference from network contents, the process proceeds to step S22 where the CPU 52 executes a process to present the network contents. Namely, in this case, reference to broadcast contents is prohibited.

At step S17, in the case of a determination that information of the authentication information server is contained in the BIT, the process proceeds to step S18. The CPU 52 controls the modem 53A on the basis of the address information read out of the BIT descriptor, to access the address thereof through the Internet 8 (access is to the authentication information server 10, in the FIG. 1 example).

The CPU 52 requests the authentication information server 10 to authenticate the broadcast contents and network contents. Upon the request, the authentication information server 10 makes reference to the process shown in the flowchart of FIG. 7, to execute an authentication process on the broadcast contents and network contents in the manner described hereinafter, and sends a result of the authentication (step S44 in FIG. 7).

At step S19, the CPU 52 of the digital broadcast receiver 4 receives the authentication result from the authentication information server 10 through the modem 53A. At step S20, the CPU 52 determines whether the received authentication result allows for making reference to broadcast contents based on the network contents. In the case that reference is not allowed, the process proceeds to step S22 where the CPU 52 executes a process to present only the network contents. Namely, in this case, reference to broadcast contents is prohibited, and the monitor 5 displays only the network contents NC as shown in FIG. 2B.

At step S21, in the case of a determination that the authentication result allows for a reference, the process proceeds to step S21. The CPU 52 executes a process to display the network contents simultaneously with broadcast contents.

Namely, at this time, the CPU 52 causes the BPSK demodulator 42 to demodulate the reception signal outputted from the tuner 41, and the TS decoding section 43 to separate it into video data and audio data. The video data is decoded by the video decoding section 45 and provided to the presentation processing section 46. The presentation processing section 46 combines the video signal of data contents stored in the RAM 51 with the video signal of the broadcast contents provided from the video decoding section 45, thus making an output and display on the monitor 5. In this manner, as shown in FIG. 2A, the network contents NC and the broadcast contents BC are displayed simultaneously on the same screen.

Meanwhile, at this time, the audio decoding section 44 decodes the audio data and outputs it through the speaker.

Figure 7:
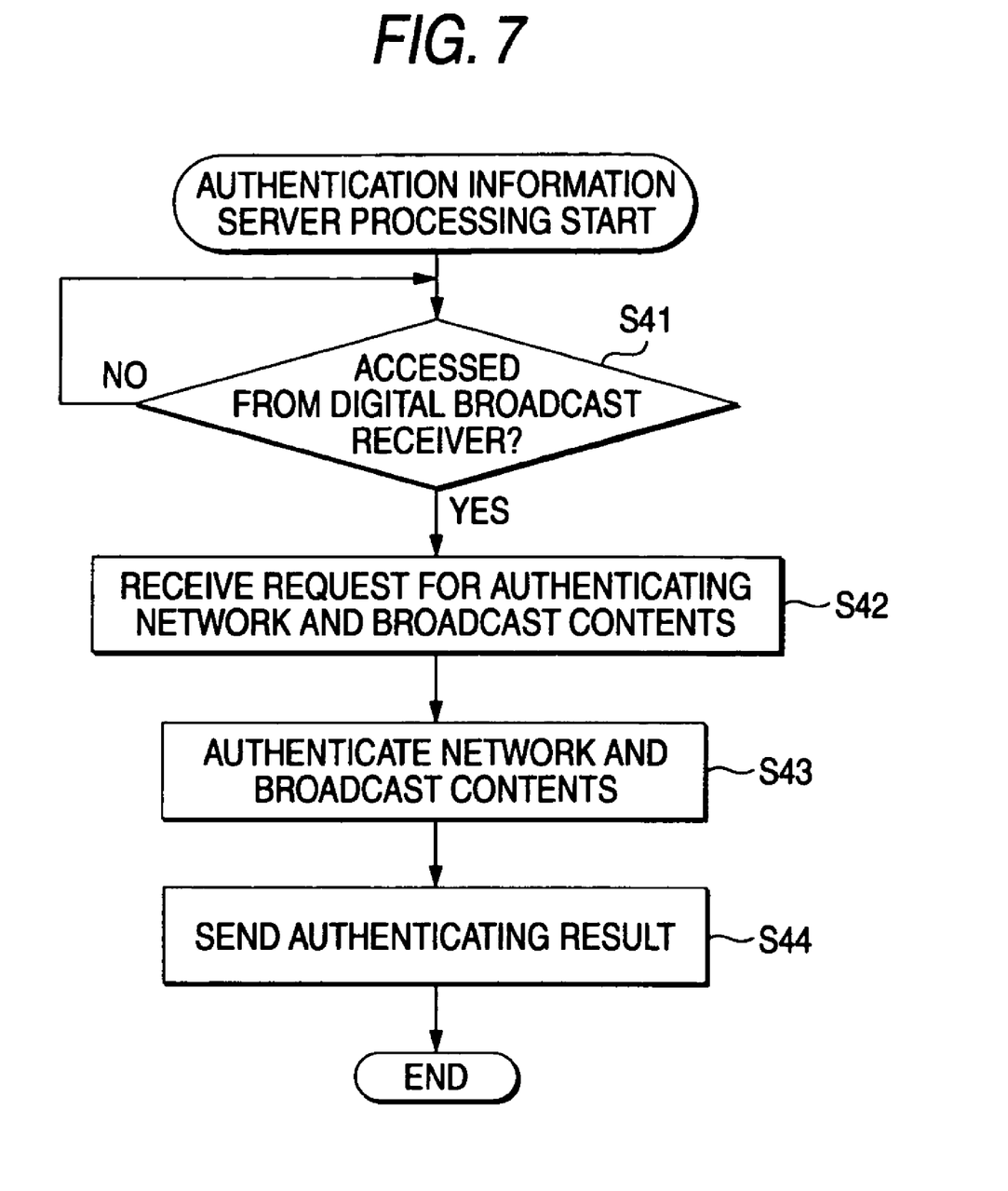
FIG. 7 is a flowchart of the process of the authentication information server of FIG. 1, in accordance with an embodiment of the present application.

Now referring to the flowchart of FIG. 7, explanation is made of a process of the authentication information server 10 to be executed correspondingly to the above process of the digital broadcast receiver 4.

At step S41, the CPU 71 of the authentication information server 10 waits until accessed (receives an access request) from the digital broadcast receiver 4 through the communicating section 79. When accessed, the process proceeds to step S42, to receive a request for authenticating network contents and broadcast contents sent from the digital broadcast receiver 4 through the Internet 8 (this request is sent by the process of step S18 of FIG. 5).

Receiving the request from the digital broadcast receiver 4 through the communicating section 79, the CPU 71 at step S43 carries out an authentication process of the network contents and broadcast contents. Namely, the CPU 71 stores the authentication information needed in authenticating a reference by the network contents to broadcast contents, in the authentication information database 10A configured in the storage section 78. Based on the authentication information, authentication process is carried out. When an authentication result is obtained, the CPU 71 at step S44 controls the communicating section 79, to send the authentication result to the digital broadcast receiver 4 through the Internet 8. The digital broadcast receiver 4 controls a reference to broadcast contents based on the network contents according to the authentication result, as explained above (steps S20 to S22 in FIG. 5).

In the case that the authentication information database 10A stores, as authentication information, a list of the network contents allowed for reference by broadcast contents (which is sent by the broadcast stations 1-1, 1-2), the digital broadcast receiver 4 when sending a request process of step S18 in FIG. 5 adds an ID for identifying the broadcast contents to the request. The CPU 71 of the authentication information server 10 searches, from the authentication information database 10A, a list of the network contents allowed for a reference by the broadcast contents identified by the ID. A list of searched network contents is sent, at step S44 of FIG. 7, as an authentication result to the digital broadcast receiver 4.

Figure 8:
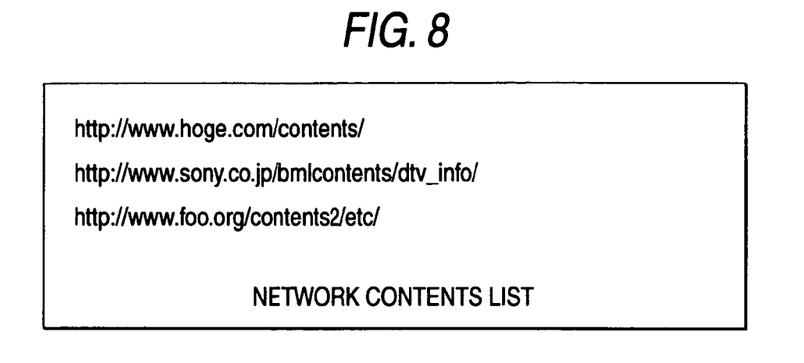
FIG. 8 shows an example of network contents list, in accordance with an embodiment of the present application.

FIG. 8 represents a list example of such network contents. In this example, three network contents are described in URI.

Accordingly, in this case, the CPU 52 of the digital broadcast receiver 4, in a determining process of step S20 of FIG. 5, determines whether the network contents received in the process of step S11 is contained in the list of network contents, as an authentication result, received in the process of step S19. In the case that the network contents received in the process of step S11 are contained in the list of network contents received in the process of step S19, a determination is made that reference to broadcast contents is allowed based on the network contents. If the network contents are not contained in the list, a determination is made that reference to the broadcast contents is not allowed.

In this manner, in this example, because a list of network contents is sent as an authentication result, the digital broadcast receiver 4 is more burden or involved in the determination process. Also, for this reason, there is an increase in amount of the data to be sent from the authentication information server 10 to the digital broadcast receiver 4.

Accordingly, the determination process can be made by the authentication information server 10, to send only a conclusion representative of whether authentication is allowed from the authentication information server 10 to the digital broadcast receiver 4.

In this case, for example, the digital broadcast receiver 4, when requesting for authentication at step S18 of FIG. 5, uses a CGI (Common Gateway Interface) to describe network contents URI and broadcast contents URI to an argument thereof.

Figure 9:
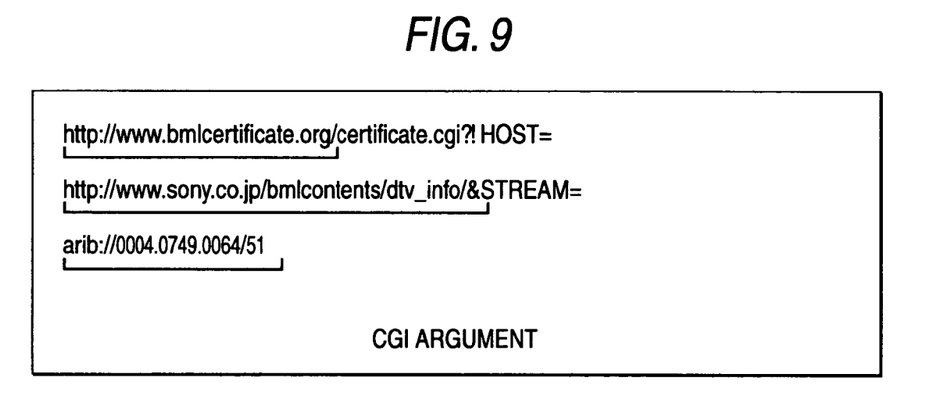
FIG. 9 shows an example of a CGI argument, in accordance with an embodiment of the present application.

FIG. 9 represents an example of a CGI argument in this case. In this example, the phrase "http://www.sony.co.jp/bm-lcontents/dtv_info" represents a URI of network contents. The URI of broadcast contents being made reference to by the network contents is represented by the phrase "arib://0004.0749.0064/51." The phrase "http://www.bmlcertificate.org" represents a URI of the authentication information server 10.

The CPU 71 of the authentication information server 10, when receiving a URI representative of broadcast contents and a URI representative of network contents from the digital broadcast receiver 4, searches for whether the network contents are allowed to make reference to the broadcast contents, on the basis of the authentication information recorded in the authentication information database 10A. Namely, at this time, the authentication information database 10A has, as authentication information, a list of the network contents that each broadcast content allows for a reference or a list of the broadcast contents that each network content allows for a reference. The CPU 71, in the case that network contents and broadcast contents concerned is registered in this list, sends a response of "OK" as an authentication result to the digital broadcast receiver 4. In the case of no registration, a response of "NG" as an authentication result is sent to the digital broadcast receiver 4.

Figure 10:
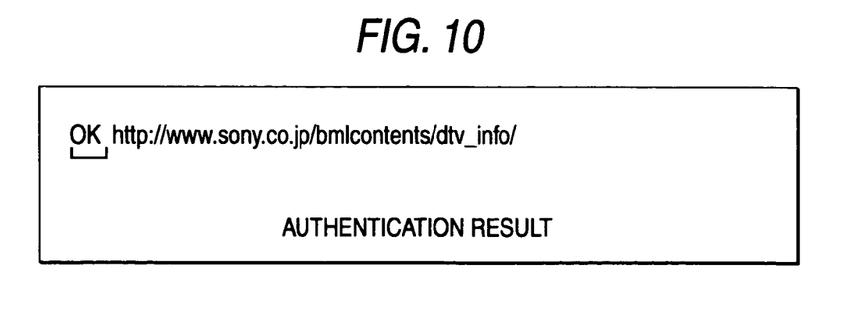
FIG. 10 shows an example of an authentication result, in accordance with an embodiment of the present application.

FIG. 10 represents an example of an authentication result to be sent from the authentication information server 10 to the digital broadcast receiver 4 in this manner. The character "OK" in the beginning represents that reference is being allowed while the term "http://www.sony.co.jp/bmlcontents/dtv_info/" represents a URI of that network contents. In the case of a response of "NG" as an authentication result, the character in the beginning is set to "NG".

By preparing various levels of responses other than "OK" and "NG", processing can be provided at various security levels.

By registering authentication information based on each user (digital broadcast receiver 4) in the authentication information database 10A besides the authentication information based on each broadcast content or each network content, reference control can be provided on a user-by-user basis (for each digital broadcast receiver 4).

Communication can be provided between the digital broadcast receiver 4 and the authentication information server 10 by utilizing SSL (Secure Sockets Layer) as required. Due to this, increased protection of contents can be provided.

The foregoing processes can be executed on hardware as well as carried out by software. In the case of executing the processes on software, a program can be configured with software and loaded from the network or recording medium onto a computer incorporated in exclusive hardware or, for example, general-purpose personal computer capable of executing various functions by being loaded with various programs.

The recording medium, as shown in FIG. 4, can be configured not only by package media such as a program-recorded magnetic disk 91 (including floppy disk), optical disk 92 (including CD-ROM (Compact Disk-Read Only Memory), DVD (Digital Versatile Disk)), magneto-optical disk 93 (including MD (Mini-Disk)) or semiconductor memory 94 distributed for supplying a program to the user separately from the apparatus main body, but also by a ROM 72 recording a program or a hard disk included in the storage section 78 provided in a state previously incorporated in the apparatus main body to the user.

In the present application, the step describing a program recorded to the recording medium can include a process to be chronologically executed along a described order, also a process to be executed in parallel or discretely even if not necessarily to be processed chronologically.

In the present application, system can refer to an apparatus or a plurality of apparatuses.

As described above, according to the present application, the second information can be prevented from being utilized unduly.

The invention claimed is:

1. An information providing system, comprising:
a network contents providing apparatus operable to provide network contents on demand to a location of a user in response to an electronically transmitted instruction by the user demanding the network contents, the network contents referencing broadcast contents for concurrent display with the network contents;
a broadcast contents providing apparatus operable to broadcast the broadcast contents for simultaneous reception at a multiplicity of receiving locations;
a third information providing apparatus operable to hold authentication information for authenticating a reference to the broadcast contents by the network contents, the network contents providing apparatus being operable to provide the network contents to the information processing apparatus; and
an information processing apparatus operable to:
receive the network contents from the network contents providing apparatus,
receive the broadcast contents being broadcast by the broadcast contents providing apparatus,
extract address information for accessing the third information providing apparatus from the received broadcast contents,
not display the received broadcast contents referenced by the received network contents in response to being unable to extract the address information from the received broadcast contents,
access the third information providing apparatus based on the extracted address information,
transmit a request to authenticate the received broadcast contents and the received network contents to the third information providing apparatus,
receive a determination result from the third information providing apparatus based on authentication information associated with the received broadcast contents and the received network contents,
concurrently display the received broadcast contents referenced by the received network contents together with the received network contents in response to the received determination result permitting such display, and
not display the received broadcast contents referenced by the received network contents in response to the received determination result not permitting such display; and
the third information providing apparatus being operable to:
hold the authentication information,
authenticate a reference by the network contents to the broadcast contents using the held authentication information when accessed from the information processing apparatus, and
send a determination result of the authenticating to the information processing apparatus.

2. The information providing system according to claim 1, wherein the network contents providing apparatus provides network contents as part of the network contents through the Internet.

3. The information providing system according to claim 2, wherein the broadcast contents providing apparatus includes the address information in a BIT (Broadcaster Information Table) of a broadcast signal for broadcasting the broadcast contents.

4. The information providing system according to claim 1, wherein the third information providing apparatus provides a list of the broadcast contents which is allowed to be referenced by the network contents, the list being provided as part of the determination result.

5. The information providing system according to claim 1, wherein the third information providing apparatus provides information representative of whether a reference to the broadcast contents by the network contents is allowed, the representative information being provided as part of the determination result.

6. The information providing system according to claim 1, wherein the information processing apparatus accesses the third information providing apparatus through the Internet based on the extracted address information.

7. An information providing method of an information providing system, the method comprising:

providing an information processing apparatus operable to receive network contents and broadcast contents using an associated processor;

providing a network contents providing apparatus using an associated processor to provide the network contents on demand to a location of a user in response to an electronically transmitted instruction by the user demanding the network contents, the network contents referencing broadcast contents for concurrent display with the network contents;

providing a broadcast contents providing apparatus using an associated processor to broadcast the broadcast contents for simultaneous reception at a multiplicity of receiving locations;

providing a third information providing apparatus using an associated processor to hold authentication information for authenticating a reference to the broadcast contents by the network contents;

using the information processing apparatus to carry out the following:
receiving the network contents from the network contents providing apparatus,
receiving the broadcast contents being broadcast by the broadcast contents providing apparatus,
extracting address information for accessing the third information providing apparatus from the received broadcast contents,
not displaying the received broadcast contents referenced by the received network contents in response to being unable to extract the address information from the received broadcast contents,
accessing the third information providing apparatus based on the extracted address information, and
transmitting a request to authenticate the received broadcast contents and the received network contents to the third information providing apparatus;

authenticating, at the third information providing apparatus, the reference by the network contents to the broadcast contents using the authentication information in response the request;

the information processing apparatus further carrying out the following:
receiving a determination result from the third information providing apparatus based on the authentication information,
concurrently displaying the received broadcast contents referenced by the received network contents together with the received network contents in response to the received determination result permitting such display, and
not displaying the received broadcast contents referenced by the received network contents in response to the received determination result not permitting such display.

8. An information processing method, comprising:

using a processor to carry out the following:
receiving network contents from a network contents providing apparatus on demand at a location of a user in response to an electronically transmitted instruction by the user demanding the network contents, the network contents referencing broadcast contents for concurrent display with the network contents,
receiving broadcast contents referenced by the network contents, the broadcast contents being received by broadcast from a broadcast contents providing apparatus for simultaneous reception at a multiplicity of receiving locations,
extracting address information for accessing a third information providing apparatus, the third information providing apparatus holding authentication information for authenticating a reference to the broadcast contents by the network contents, the address information being extracted from the broadcast contents,
not displaying the received broadcast contents referenced by the received network contents in response to being unable to extract the address information from the received broadcast contents,
accessing the third information providing apparatus based on the address information extracted by the extracting step,
transmitting a request to authenticate the received broadcast contents and the received network contents to the third information providing apparatus,
receiving a determination result from the third information providing apparatus based on the authentication information,
concurrently displaying the received broadcast contents referenced by the received network contents together with the received network contents in response to the received determination result permitting such display, and
not displaying the received broadcast contents referenced by the received network contents in response to the received determination result not permitting such display.

9. A recording medium having recorded thereon a program for causing a computer execute a method of processing information, the method comprising:

receiving network contents from a network contents providing apparatus on demand at a location of a user in response to an electronically transmitted instruction by the user demanding the network contents, the network contents referencing broadcast contents for concurrent display with the network contents;

receiving broadcast contents referenced by the network contents, the broadcast contents being received by broadcast from a broadcast contents providing apparatus for simultaneous reception at a multiplicity of receiving locations;

extracting address information for accessing a third information providing apparatus, the third information providing apparatus holding authentication information for authenticating a reference to the broadcast contents by the network contents, the address information being extracted from the broadcast contents;

not displaying the received broadcast contents referenced by the received network contents in response to being unable to extract the address information from the received broadcast contents;

accessing the third information providing apparatus based on the address information extracted by the extracting step;

transmitting a request to authenticate the received broadcast contents and the received network contents to the third information providing apparatus;

receiving a determination result from the third information providing apparatus based on the authentication information;

concurrently displaying the received broadcast contents referenced by the received network contents together with the received network contents in response to the received determination result permitting such display; and not displaying the received broadcast contents referenced by the received network contents in response to the received determination result not permitting such display.

10. A system for performing a method of processing information, the system comprising:

a processor encoded with instructions for performing a method of processing information, the method including:

receiving network contents from a network contents providing apparatus on demand at a location of a user in response to an electronically transmitted instruction by the user demanding the network contents, the network contents referencing broadcast contents for concurrent display with the network contents, receiving broadcast contents referenced by the network contents, the broadcast contents being received by broadcast from a broadcast contents providing apparatus for simultaneous reception at a multiplicity of receiving locations, extracting address information for accessing a third information providing apparatus, the third information providing apparatus holding authentication information for authenticating a reference to the broadcast contents by the network contents, the address information being extracted from the broadcast contents, not displaying the received broadcast contents referenced by the received network contents in response to being unable to extract the address information from the received broadcast contents, accessing the third information providing apparatus based on the address information extracted by the extracting step, transmitting a request to authenticate the received broadcast contents and the received network contents to the third information providing apparatus, receiving a determination result from the third information providing apparatus based on the authentication information, concurrently displaying the received broadcast contents referenced by the received network contents together with the received network contents in response to the received determination result permitting such display, and not displaying the received broadcast contents referenced by the received network contents in response to the received determination result not permitting such display.

11. The information providing system according to claim 1, wherein the information processing apparatus is operable to extract address information which includes a Uniform Resource Indicator (URI) and is operable to access the third information providing apparatus based on the extracted URI.

12. The information providing system according to claim 1, wherein the information processing apparatus is operable to process the received network contents and display the processed network contents to a user of the information processing apparatus, and process the broadcast contents received by broadcast and simultaneously display the processed broadcast contents with the network contents to a user of the information processing apparatus when the received determination result permits reference to be made to the broadcast contents based on the network contents.

* * * * *